US008961781B2

(12) United States Patent
Ma et al.

(10) Patent No.: US 8,961,781 B2
(45) Date of Patent: Feb. 24, 2015

(54) FILTER STATUS TECHNIQUES ADAPTED FOR USE WITH A CONTAINER BASED FILTRATION DEVICE

(75) Inventors: Benjamin Ma, Plesanton, CA (US); Rick T. Nishijima, Pleasanton, CA (US); John W. Jamieson, Alamo, CA (US); Edward M. Buckley, Fairfield, CT (US); Teruo Hishiki, Sheung Shui (HK); David Dycher, Causeway Bay (HK); Ho Pun Chung, Causeway Bay (HK)

(73) Assignee: Brita LP, Oakland, CA (US)

( * ) Notice: Subject to any disclaimer, the term of this patent is extended or adjusted under 35 U.S.C. 154(b) by 586 days.

(21) Appl. No.: 13/249,122

(22) Filed: Sep. 29, 2011

(65) Prior Publication Data

US 2013/0083884 A1 Apr. 4, 2013

(51) Int. Cl.
*B01D 35/143* (2006.01)
*C02F 1/00* (2006.01)
*B67D 7/22* (2010.01)
*G07C 3/02* (2006.01)

(52) U.S. Cl.
CPC .......... *C02F 1/003* (2013.01); *C02F 2209/006* (2013.01); *C02F 2209/445* (2013.01); *C02F 2307/04* (2013.01); *G07C 3/02* (2013.01)
USPC ............... 210/87; 210/91; 210/138; 210/464; 116/264; 222/23; 222/36

(58) Field of Classification Search
CPC .............. B01D 35/143; B01D 35/027; B01D 35/0273; B01D 2201/14; B01D 2207/307; C02F 1/003; C02F 2209/006; C02F 2209/445; C02F 2307/04; C02F 2307/10; B67D 3/00; B67D 3/0041; B67D 7/22; B67D 7/26; B67D 2210/001; G07C 3/02; G07C 3/10
USPC .......... 210/86, 87–89, 91, 94, 100, 121, 138, 210/139, 464, 466, 469, 470–477, 482, 739, 210/767; 222/14, 17, 18, 20, 23, 36, 222/189.06, 37, 41, 1; 340/609, 610, 603; 116/264, 273, 228, 229; 377/15
See application file for complete search history.

(56) References Cited

U.S. PATENT DOCUMENTS

| | | |
|---|---|---|
| 5,089,144 A | 2/1992 | Ozkahyaoglu et al. |
| 5,190,643 A | 3/1993 | Duncan et al. |
| 5,236,578 A | 8/1993 | Oleskow et al. |
| 5,328,597 A * | 7/1994 | Boldt et al. ................ 210/87 |

(Continued)

FOREIGN PATENT DOCUMENTS

| | | |
|---|---|---|
| DE | 10143884 | 3/2003 |
| RU | 2342325 | 12/2008 |

(Continued)

*Primary Examiner* — Joseph Drodge
(74) *Attorney, Agent, or Firm* — Thomas C. Feix; Stacy H. Combs

(57) ABSTRACT

A filter status module for use with a container based filtration device includes a dispensing sensor and a user interface communicatively coupled to a processing unit. The processing unit counts a number of dispensing events, duration and/or angle of tilt signaled by the dispensing sensor and outputs a filter status on the user interface as a function of the number of dispensing events, duration and/or angle of tilt. The processing unit may further track an elapsed period of time from insertion of a new filter and output the filter status as a further function of the elapsed period of time.

22 Claims, 6 Drawing Sheets

(56) References Cited

U.S. PATENT DOCUMENTS

| | | | |
|---|---|---|---|
| 5,457,665 A | 10/1995 | Reid | |
| 5,536,394 A | 7/1996 | Lund et al. | |
| 5,540,107 A * | 7/1996 | Silverman et al. | 73/861.78 |
| 5,785,844 A | 7/1998 | Lund et al. | |
| D399,141 S | 10/1998 | Huang et al. | |
| D406,536 S | 3/1999 | Huang et al. | |
| 5,876,610 A * | 3/1999 | Clack et al. | 210/739 |
| 5,882,507 A | 3/1999 | Tanner et al. | |
| 5,900,138 A | 5/1999 | Moretto | |
| 6,074,552 A | 6/2000 | Allen | |
| 6,224,751 B1 | 5/2001 | Hofmann et al. | |
| 6,287,456 B1 * | 9/2001 | Fish et al. | 210/85 |
| 6,306,290 B1 | 10/2001 | Rolfes | |
| 6,432,300 B2 * | 8/2002 | Larkner et al. | 210/87 |
| 6,491,811 B2 | 12/2002 | Conrad et al. | |
| 6,517,707 B2 | 2/2003 | Giordano et al. | |
| 6,649,045 B2 | 11/2003 | Tanner et al. | |
| D501,755 S | 2/2005 | Namur | |
| 6,881,327 B2 | 4/2005 | Tanner et al. | |
| 7,107,838 B2 | 9/2006 | Chai et al. | |
| 7,294,277 B2 | 11/2007 | Moretto | |
| 7,487,677 B2 | 2/2009 | Chai et al. | |
| 7,569,138 B2 | 8/2009 | Moretto | |
| 7,638,042 B2 * | 12/2009 | Astle et al. | 210/85 |
| 7,670,479 B2 * | 3/2010 | Arett et al. | 210/85 |
| 7,678,282 B2 * | 3/2010 | Moretto | 210/746 |
| 8,480,882 B2 * | 7/2013 | Cueman et al. | 210/85 |
| 8,608,026 B1 * | 12/2013 | Temko et al. | 222/41 |
| 2006/0060512 A1 * | 3/2006 | Astle et al. | 210/85 |
| 2006/0144766 A1 | 7/2006 | Felmeri et al. | |
| 2006/0191824 A1 * | 8/2006 | Arett et al. | 210/85 |
| 2007/0209981 A1 | 9/2007 | Moretto | |
| 2008/0047883 A1 | 2/2008 | Fedotov | |
| 2008/0133150 A1 * | 6/2008 | Mogadam | 702/45 |
| 2010/0084347 A1 | 4/2010 | Wilder et al. | |
| 2010/0187168 A1 | 7/2010 | Moretto | |
| 2010/0282692 A1 | 11/2010 | Alexandrou | |
| 2011/0180563 A1 * | 7/2011 | Fitchett et al. | 222/1 |
| 2011/0290741 A1 * | 12/2011 | Cueman et al. | 210/767 |

FOREIGN PATENT DOCUMENTS

| | | |
|---|---|---|
| WO | WO0194893 | 12/2001 |
| WO | WO03031018 | 4/2003 |
| WO | WO2005008513 | 1/2005 |
| WO | WO2009013072 A1 | 1/2009 |
| WO | WO2009090678 | 7/2009 |
| WO | WO2010122319 | 10/2010 |

* cited by examiner

FILTER STATUS TECHNIQUES ADAPTED FOR USE WITH A CONTAINER BASED FILTRATION DEVICE

BACKGROUND OF THE INVENTION

Water filtration has become common in homes, offices and other places to produce cleaner and better tasting water. Common filtration systems include water pitcher filtration, refrigeration filtration, faucet filtration, and the like. The filtration devices include a filter through which the water passes to remove particles, chemicals, microbes and the like. For proper operation, the filters should be changed periodically.

A number of techniques have been employed to indicate when to replace the filter on water pitcher type filtration devices. Because of the nature of water pitcher type filtration devices, the techniques for indicating when to replace the filter are more limited than the other types of filtration systems. Some techniques use a flow sensor or a float sensor that makes contact with the water, a switch coupled to a fill lid, or the like, to measure the amount of water being filtered. Such techniques are relatively complicated to manufacture, may themselves introduce impurities and/or microbes into the water as a result of the contact with the water. Other techniques use a timer and output a signal to the user to change the filter after a predetermined period of time. However, if the water pitcher is used more often than the predetermined time is based upon, the filter may need to be changed more often than the time indicates. Accordingly, there is a continuing need for improved techniques for monitoring the status of the filter and indicating when to change the filter.

SUMMARY OF THE INVENTION

The present technology may best be understood by referring to the following description and accompanying drawings that are used to illustrate embodiment of the present technology.

Embodiments of the present technology are directed toward fluid filtration devices. In one embodiment, the device includes a container, a filter removably coupled to the container, and a filter status module coupled to the container. The filter is adapted to filter fluid in the container. The filter status module includes a dispensing sensor and a user interface communicatively coupled to a processing unit. The processing unit counts a number of dispensing events or an estimated dispensed volume signaled by the dispensing sensor and outputs a filter status on the user interface as a function of the number of dispensing events or estimated dispensed volume. The processing unit may also track an elapsed period of time from insertion of a new filter and output the filter status as a further function of the elapsed period of time.

In another embodiment, a method includes receiving by a processing unit a dispensing signal from a dispensing sensor, wherein the dispensing signal indicates a dispensing event each time a container is manipulated to pour fluid filtered by a filter. The processing unit counts the number of dispensing events, the duration of the events and/or the angle of tilt during the events and outputs a status of the filter as a function thereof on a user interface. The processing unit may also track an elapsed period of time from insertion of the filter in the container and output the status of the filter as a further function of the elapsed period of time.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
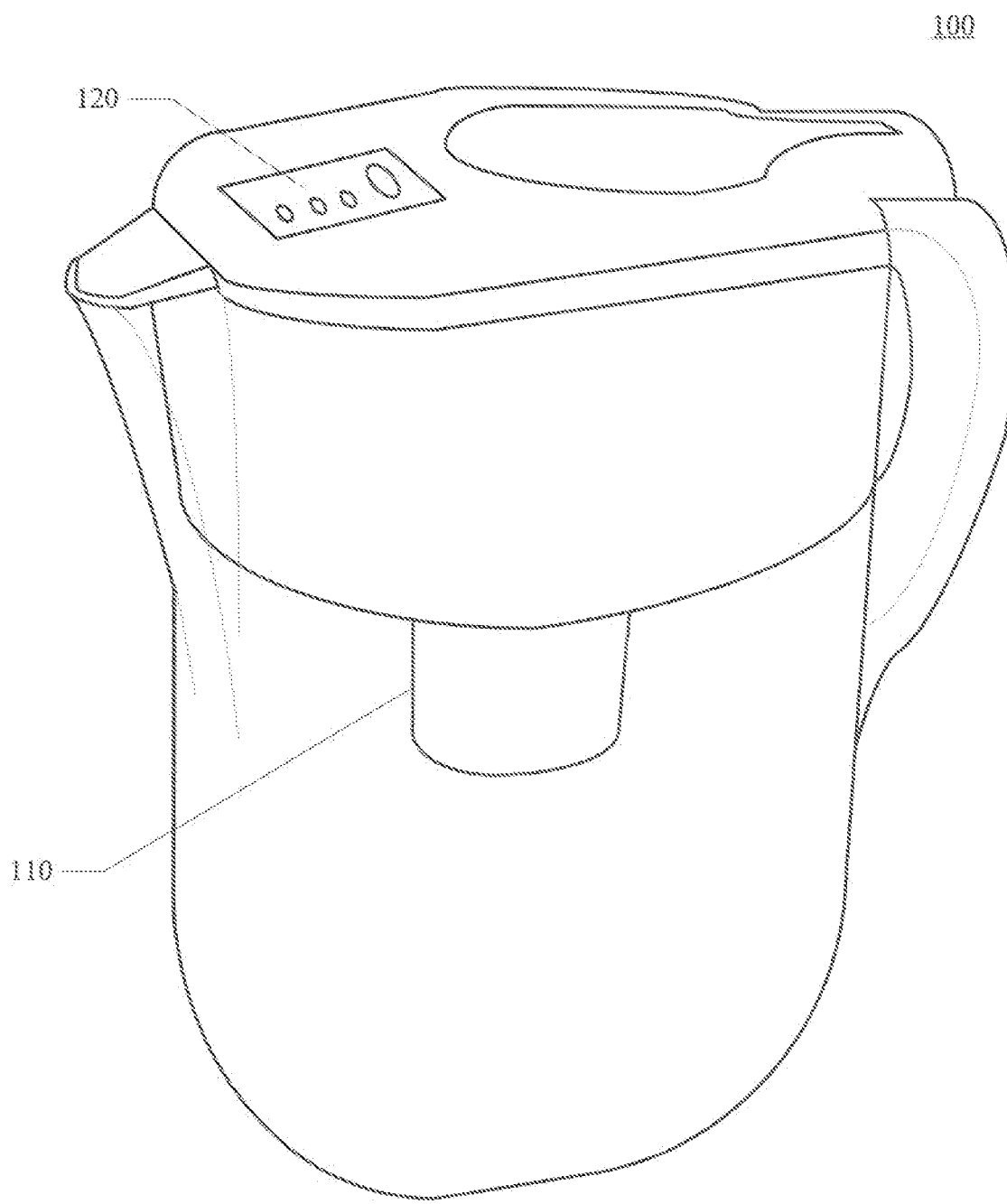
FIG. 1 shows perspective view of an exemplary container including a filter and a filter status module, in accordance with one embodiment of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the action and processes of an electronic device such as an electronic computing device that manipulates and transforms data. The data are represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects.

Referring now to FIG. 1, a container 100 including a filter 110 and a filter status module 120, in accordance with one embodiment of the present technology, is shown. In one implementation, the container 100 may be a pitcher, bottle, or the like, and the filter may be a water filter. The container 100 may include an integral lid, or a lid that is removably coupled to the container. The container may include a fluid inlet and a fluid outlet, or it may contain a combined/unified fluid inlet/outlet. For convenience, the container is described herein with reference to a separate fluid inlet and outlet. However, it is understood that any reference to a fluid inlet, or equivalent thereof, also refers to a combined fluid inlet/outlet unless specifically indicated otherwise. Similarly, any reference to a fluid outlet, or equivalent thereof, also refers to a combined fluid inlet/outlet unless specifically indicated otherwise. The fluid inlet and/or outlet may be integrally formed in the lid, in the side of the container or a combination of the lid and side of the container.

The filter 110 is removably coupled to the container 100. The filter 110 is adapted to filter fluid, such as water and the like, as the container 100 is filled with fluid or as the fluid is dispensed from the container 100. The fluid is dispensed from the container 100 by manipulating the container 100 to cause the fluid to flow through the outlet.

The filter status module 120 may be removably coupled to the container 100. In one implementation, the filter status module 120 is disposed in the lid of the container 100. The filter status module 120 may be coupled to the lid of the container 100 by one or more retaining and/or orientating form factors, such as notches, extensions, clips and or the like. The filter status module 120 may have a fluid resistant enclosure that is removably seated in a filter status module receptacle formed in the lid of the container 100.

Figure 2:
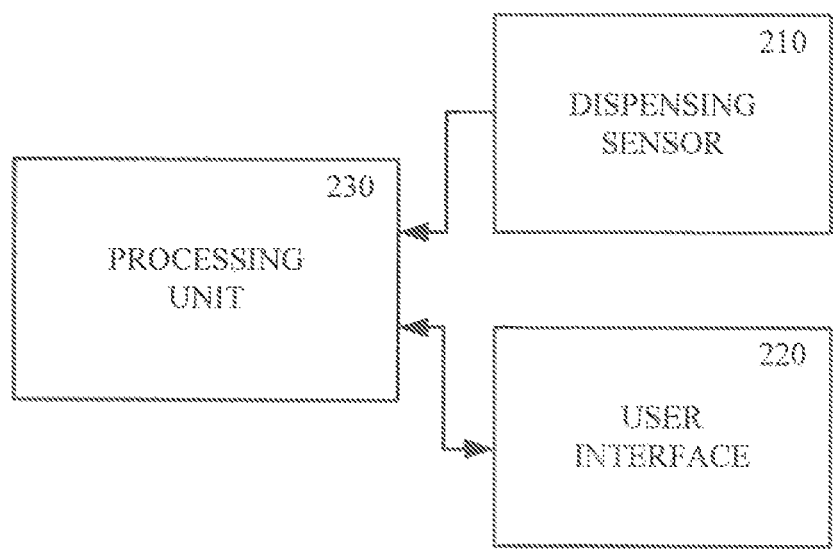
FIG. 2 shows a block diagram of a filter status module, in accordance with one embodiment of the present technology

Referring now to FIG. 2, a filter status module 120, in accordance with one embodiment of the present technology, is shown. The filter status module 120 includes a dispensing sensor 210 and a user interface 220 communicatively coupled to a processing unit 230. The dispensing sensor 210 may be a tilt switch (also commonly referred to as a ball switch), accelerometer or the like. The user interface 220 may include one or more display elements and one or more buttons, keys, switches, or the like.

The processing unit 230 counts a number of dispensing events signaled by the dispensing sensor 210 and outputs a filter status on the user interface 220 as a function of the number of dispensing events. In another implementation, the processing unit 230 may time the duration of the dispensing event and correlate the duration to the volume of fluid poured. In yet another implementation, the processing unit 230 may time the duration of the dispensing and the angle of tilt, and correlate the duration and angle of tilt to the volume of fluid poured. The processing unit 230 may also track an elapsed period of time from insertion of a new filter and output the filter status as a further function of the elapsed period of time.

Figure 3:
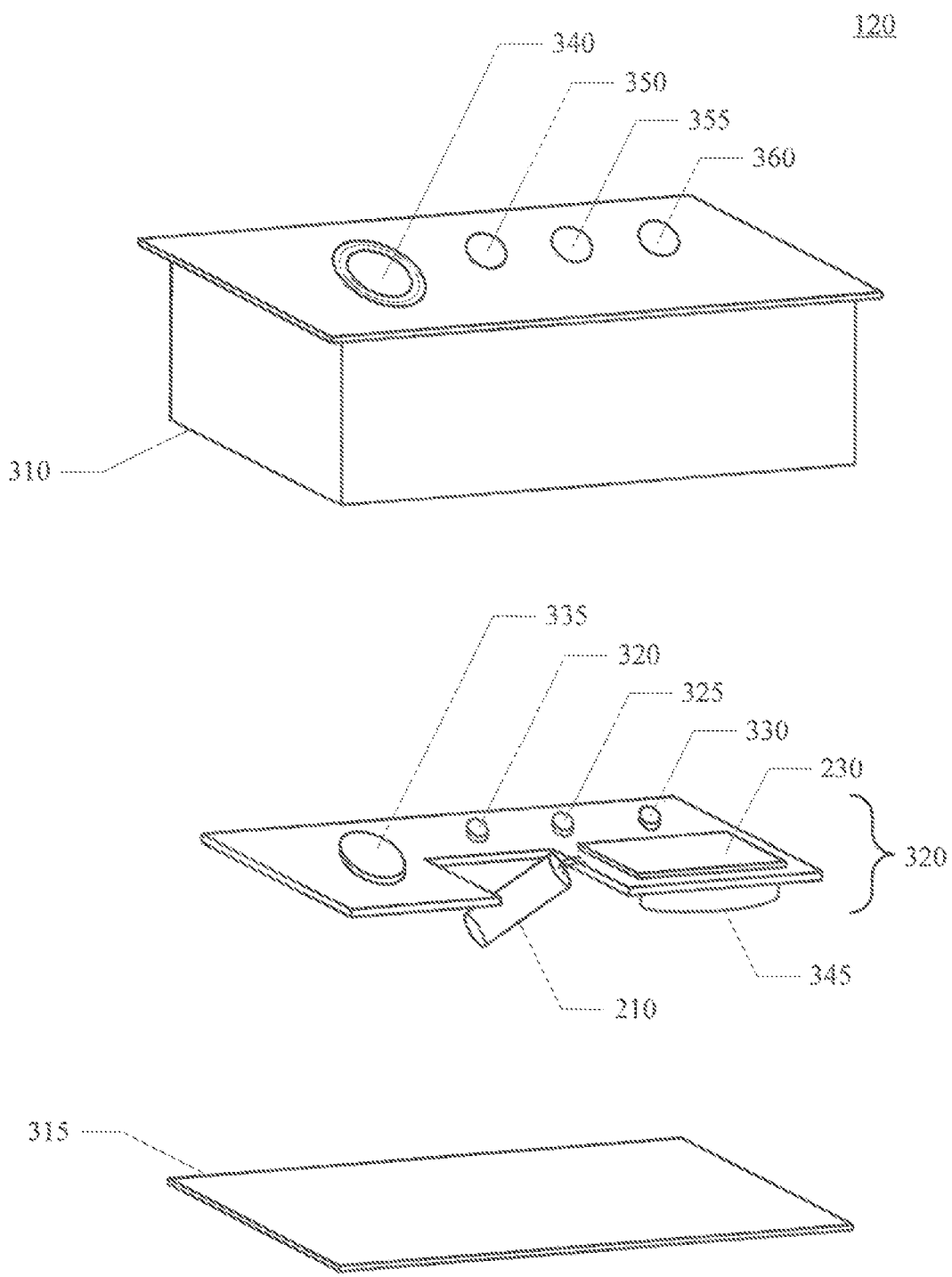
FIG. 3 shows an exploded view of an exemplary filter status module, in accordance with one embodiment of the present technology.

Referring now to FIG. 3, a filter status module 120, in accordance with one embodiment of the present technology, is shown. The filter status module 120 includes a fluid resistant enclosure 310, 315 that is adapted to be removably seated in a receptacle formed in the lid of the container 100. In one implementation, the enclosure includes an upper portion 310 and a lower portion 315 that are sealed together. The enclosure 310, 315 of the filter status module 120 houses a printed circuit board assembly (PCBA) 320. In one implementation, the PCBA includes a dispensing sensor 210, three indicator elements 320, 325, 330, a momentary switch 335, 340, the processing unit 230 and a battery 345.

In one implementation, the dispensing sensor 210 may be a tilt switch, accelerometer or the like. In one implementation, the tilt switch signals a dispensing event to the processing unit 230 when the tilt switch is in a given position and does not signal a dispensing event when the tilt switch is out of the given position.

In one implementation, the actuator 340 of the momentary switch 335, 340 is disposed through an opening in the enclosure 310, 315. In one implementation, a seal between the actuator 340 and the opening in the enclosure 310, 315 provides a fluid resistant seal there between while also enabling activation of the switch element 335 of the momentary switching element 335, 340.

In one implementation, the indicator elements 320, 325, 330 include three light emitting diodes (LEDs) disposed in apertures 350, 355, 360 in the enclosure 310, 315. In one implementation, the LEDs 320, 325, 330 include a green LED used to indicate that the filter 110 does not need to be changed, a yellow LED used to indicate that the filter 110 will need to be change soon, and a red LED used to indicate that the filter 110 should be changed. In one implementation, the three indicator elements 320, 325, 330 and the momentary switch 335, 340 form the user interface 220 of the filter status module 120. Operation of the filter status module 120 will be further explained with reference to FIGS. 4A and 4B.

Figure 4A:
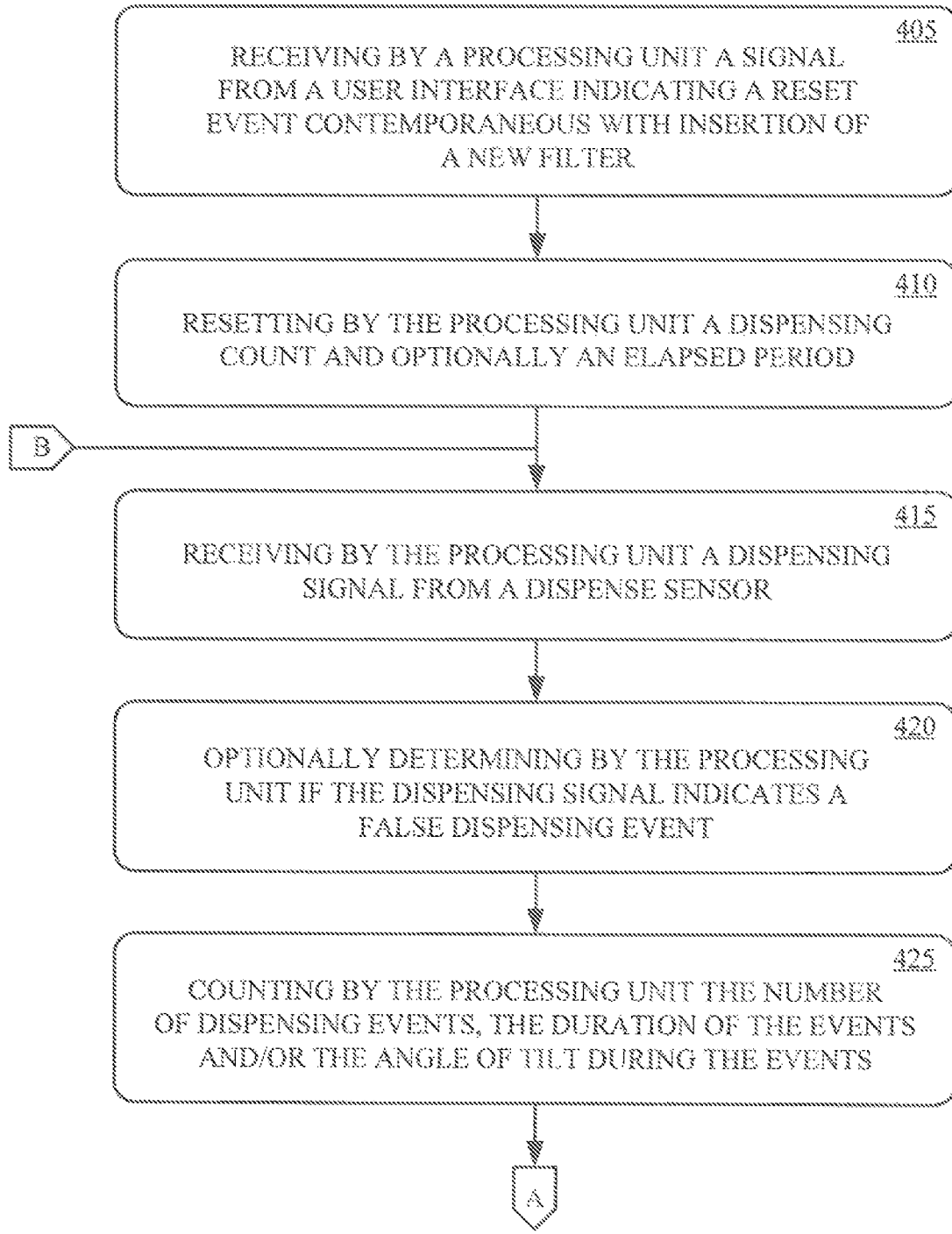
FIGS. 4A and 4B show a block diagram of a method of monitoring a status of a filter, in accordance with one embodiment of the present technology.
Figure 4B:
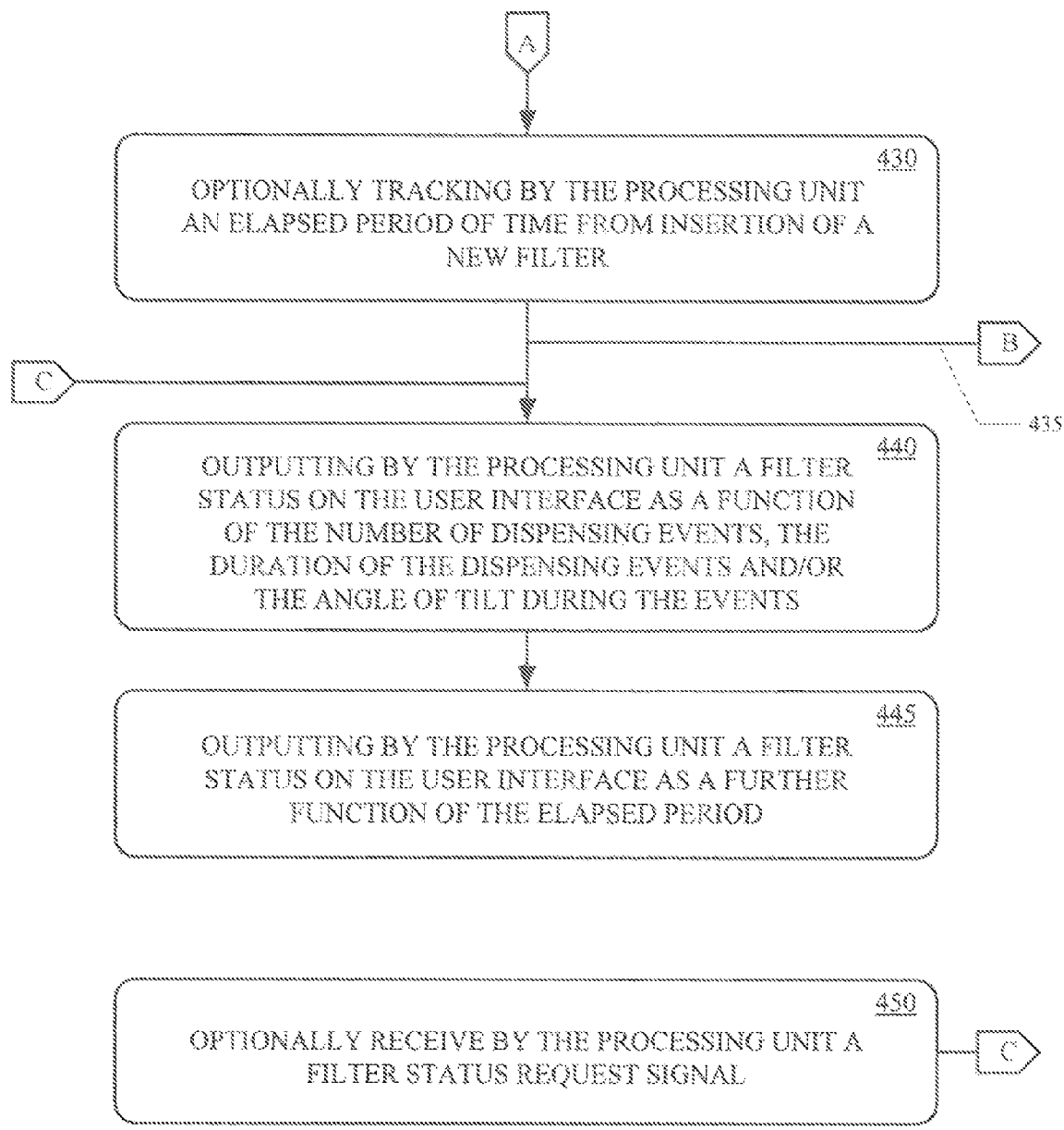

Referring now to FIGS. 4A and 4B, a method of monitoring a status of a filter, in accordance with one embodiment of the present technology, is shown. The method may be implemented as computing device-executable instructions (e.g., computer program) that are stored in computing device-readable media (e.g., computer memory) and executed by a computing device (e.g., processor). The method may begin with the processing unit 230 receiving a signal indicating a reset event contemporaneous with inserting a new filter 110 in the container 100, at 405. In one implementation, the reset event signal may be received by the processing unit 210 in response to activation of the reset button (e.g., momentary switch 335, 340) by a user for more than a predetermined amount of time. At 410, the processing unit 210 resets a dispensing count or volume of fluid poured, and optionally an elapsed period.

Thereafter, the processing unit 210 may receive a dispensing signal from the dispensing sensor 210, at 415. The dispensing sensor 210 may be a tilt switch, an accelerometer or the like. In one implementation, a tilt switch generates the dispensing signal when the container 100 is tilted into a position in which fluid would be dispensed from the container 100. Optionally, the processing unit 220 may determine if the dispensing signal indicates a false dispensing event, at 420. For example, if the duration of a given dispensing signal is greater than a predetermined false dispensing period, such as when the pitcher is knocked over or stored on its side, the processing unit 220 may determine that the given dispensing signal is not a dispensing event, referred to herein as false dispensing events. At 425, the processing unit 220 counts the number of dispensing events. Alternatively, the processing unit 220 may time the duration of the dispensing event, or the duration of the dispensing event and the angle of tilt of the dispensing event. The processing unit 220 then correlates the duration of the dispensing event, or the duration and angle of the pour tilt to a volume of fluid dispensed. The processing unit 220 may ignore any false dispensing events if determined by the processing unit 220. Optionally, at 430, the processing unit 220 may also track an elapsed period of time starting from the reset event (e.g., when the filter is changed).

The processes at 415-425 are repeated, in response to each dispensing signal received from the dispensing sensor 210, until the processing unit 220 determines that the dispensing event count or the dispensed volume is within one or more predetermined ranges, at 435. Optionally, the processes at 415-430 may also be repeated, in response to each dispensing signal received from the dispensing sensor 210, until the processing unit 220 determines that the elapsed period of time exceed one or more predetermined time periods.

At 440, the processing unit 220 outputs a filter status on the user interface 230 as a function of the dispensing event count or the dispensed volume. Optionally, the processing unit 220 may output the filter status on the user interface 230 as a further function of the elapsed period of time from when the filter 110 was last changed, at 445. The processing unit 220 may output a corresponding one of a plurality of filter states, at processes 440 and 445, for a predetermined period of time after each dispensing event. In one implementation, the processing unit 220 outputs a filter state by driving a green LED 320 when the dispensing event count or the dispensed volume is less than a first predetermined value (e.g., 450 pours or 2800 ounces) and the elapsed period of time is less than a first predetermined period (e.g., 45 days), indicating that the state of the filter 110 is "good." The processing unit 220 drives a yellow LED 325 when the dispensing event count or the dispensed volume is between the first predetermined value (e.g., 450 pours or 2800 ounces) and a second predetermined value (e.g., 620 pours or 3800 ounces), or the elapsed period of time is between a first predetermined period (e.g., 45 days) and a second predetermined period (e.g., 62 days), indicating that the state of the filter 110 is "change soon." The processing unit 220 drives a red LED when the dispensing event count or dispensed volume is greater than the second predetermined value (e.g., 620 pours or 3800 ounces), or the elapsed period of time is greater than the second predetermined period (e.g., 62 days), indicating that the state of the filter 110 is "change."

Optionally, the processing unit 220 may receive a signal indicating a display filter status, at 450. In one implementation, the display filter status signal may be received by the processing unit 220 in response to activation of the reset button (e.g., momentary switch 335, 340) by the user for less than the predetermined amount of time. In response the processing unit 210 may output a corresponding one of the plurality of filter states at process 445 and optionally process 450.

Optionally, the processing unit 220 may place one or more sub-circuits, such as the status indicator elements 320, 325, 330 or a portion of the processing unit 220 itself in a standby or sleep mode. The sub-circuits of the filter status module 120 and/or portions of the processing unit 220 may be placed in a standby or sleep mode to conserve the power supplied by the battery 345. The filter status module 120, except for the input portion of the processing unit (e.g., always on input partition of the processing unit) 220 and the dispensing sensor 210, may enter a standby or sleep mode, for example, after the filter status has been output for the predetermined period of time. The input portion of the processing unit 220 wakes up the rest of the processing unit 220 upon receipt of a dispensing signal received from the dispensing sensor 210. Similarly, the filter status module 120, except for the input portion of the processing unit 220, may enter a standby or sleep mode when a false dispensing event, caused for example when the container is stored on its side, is determined. The filter status module 120 may then wake up in response to a filter status request signal, a reset event or the like.

Figure 5:
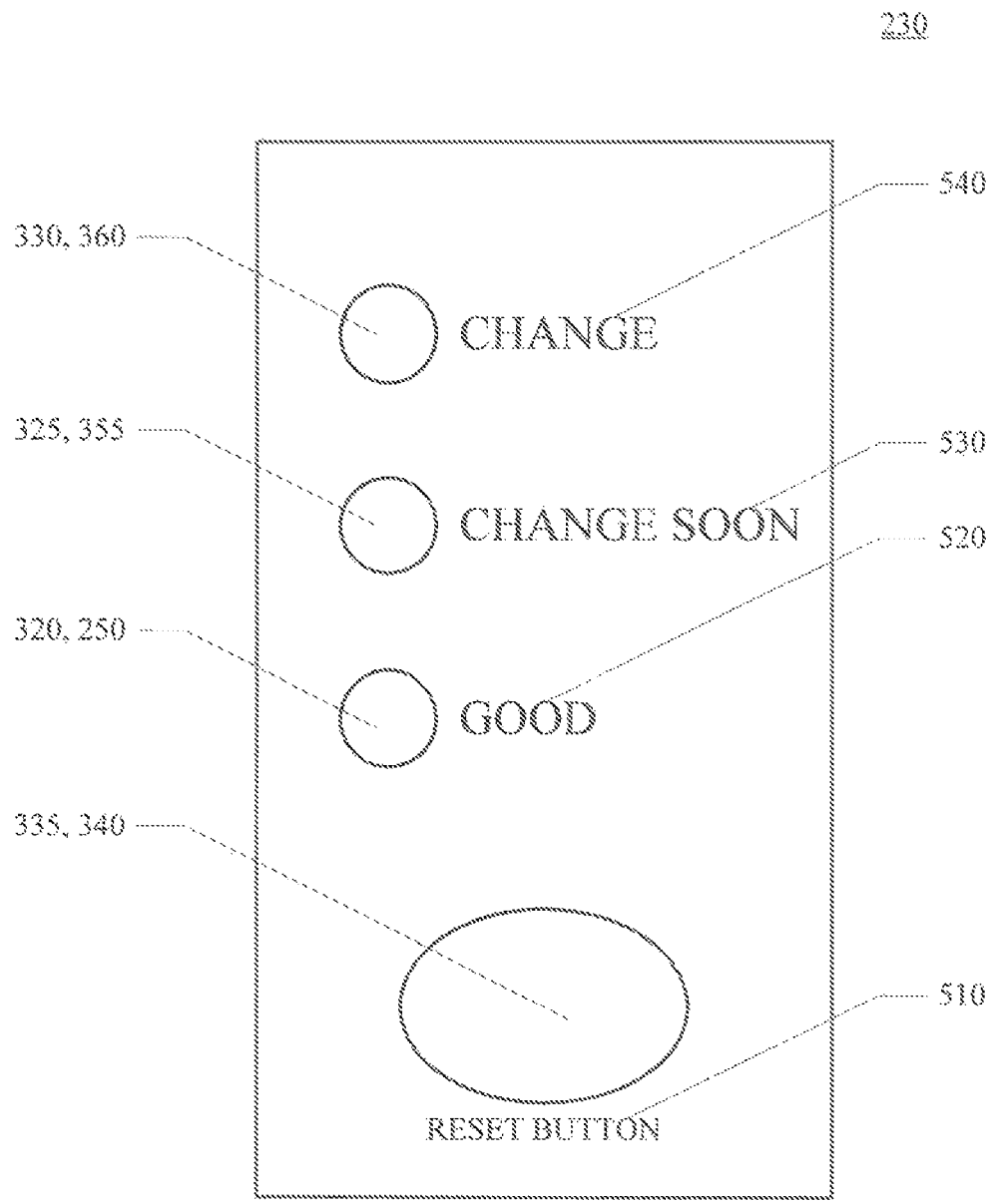
FIG. 5 shows a block diagram of an exemplary user interface of filter status module, in accordance with one embodiment of the present technology.

Referring now to FIG. 5 an exemplary user interface 230 of filter status module 120, in accordance with one embodiment of the present technology, is shown. The user interface 230 includes a momentary switch 340, three LEDs 320, 325, 330 and the corresponding apertures 350, 355, 360, and graphics. In one implementation the LEDs include a green LED 320, a yellow LED 325, and a red LED 330. The graphics include a "reset button" label 510, a "good" status label 520, a "change soon" status label 530, and a "change" status label 540. In one implementation, the processing unit 220 outputs a filter state by driving the green LED 320 when the dispensing event count or dispensed volume is less than a first predetermined value (e.g., 450 pours or 2800 ounces) and the elapsed period of time is less than a first predetermined period (e.g., 45 days), indicating that the state of the filter 110 is "good." The processing unit 220 drives the yellow LED 325 when the dispensing event count or dispensed volume is between the first predetermined value (e.g., 450 pours 2800 ounces) and a second predetermined value (e.g., 620 pours or 3800 ounces), or the elapsed period of time is between a first predetermined period (e.g., 45 days) and a second predetermined period (e.g., 62 days), indicating that the state of the filter 110 is "change soon." The processing unit 220 drives the red LED when the dispensing event count or dispensed volume is greater than the second predetermined value (e.g., 620 pours or 3800 ounces), or the elapsed period of time is greater than the second predetermined period (e.g., 62 days), indicating that the state of the filter 110 is "change."

In one implementation, the user pushes the reset button 335, 340 for more than a predetermined amount of time to indicate that a new filter 110 has been inserted in the container 100. In addition, a corresponding one of the plurality of filter states is output on the LEDs 320, 325, 330 in response to the user pushing the reset button 335, 340 for less than a predetermined amount of time.

Accordingly, embodiments of the present technology advantageously display the state of a filter as a function of the number of dispensing events or estimated dispensed volume since the last time the filter was changed. In addition, embodiments may further display the state of the filter as a function of the elapsed time since the last time the filter was changed. The filter status module advantageously is implemented in a self contained fluid resistant module that is adapted for seating/insertion in a receptacle on the container. The filter status module advantageously determines the state of a filter without making contact with the fluid being dispensed from the container. The filter status module, therefore, advantageously, reduces the possibility of introducing impurities and/or microbes into the fluid. The filter status module is also relatively simple to manufacture for a number of different containers including filters that should be periodically changed.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A device comprising:
a container;
a filter that is removably coupled to the container, and
a filter status module, coupled to the container, including;
a dispensing sensor operable to detect and signal a dispensing event that has a duration and that corresponds to a tilt angle of the container;
a user interface; and
a processing unit, communicatively coupled to the dispensing sensor and the user interface, to time the duration of the dispensing event and correlate the duration and angle of the tilt of the dispensing event to a dispensed volume of fluid, and to output a filter status on the user interface as a function of the dispensed volume.

2. The device of claim 1, wherein the processing unit also tracks an elapsed period of time from insertion of a new filter and outputs the filter status on the user interface as a further function of the elapsed period of time.

3. The device of claim 2, wherein the processing unit resets the elapsed period of time in response to a reset event received by the processing unit from the user interface.

4. The device of claim 1, wherein the processing unit reset the dispensing event count or estimated dispensed volume in response to a reset event received by the processing unit from the user interface.

5. The device of claim 1, wherein the processing unit outputs the filter status on the user interface in response to each dispensing event.

6. The device of claim 1, wherein the processing unit outputs the filter status on the user interface in response to a filter status request signal from the user interface.

7. The device of claim1, wherein for each of a plurality of different tilt angles, the processing unit is operable to determine a different respective dispensed volume corresponding to the tilt angle.

8. The device of claim 1, wherein no portion of the filter status module contacts fluid being dispensed from the container.

9. A device comprising:
a dispensing sensor operable to detect and signal one or more dispensing events, each of which has a respective duration and corresponds to a respective tilt angle of an associated container, wherein no dispensing event is signaled when the container is positioned on its side;
a user interface; and
a processing unit, communicatively coupled to the dispensing sensor and the user interface, to correlated and estimated dispensed volume to a number of dispensing events signaled by the dispensing sensor and to output a filter status on the user interface as a function of the estimated dispensed volume, wherein estimation of the dispensed volume by the processing unit is based on the duration and container tilt angle of each of the number of dispensing events.

10. The device of claim 9, wherein the dispensing sensor signals the dispensing event to the processing unit when the dispensing sensor is in a given position and does not signal the dispensing event when the dispensing sensor is out of the given position.

11. The device of claim 9, wherein the user interface includes a green LED to output a good filter status, yellow LED to output a change filter soon status, and a red LED to output a change filter status.

12. The device of claim 9, wherein the processing unit also tracks an elapsed period of time from insertion of a new filter and outputs the filter status on the user interface as a further function of the elapsed period.

13. The device of claim 9, wherein the user interface includes a switch to signal a reset event to the processing unit and the processing unit resets the filter status in response to the reset event.

14. A method comprising:
receiving by a processing unit a dispensing signal from a dispensing sensor, wherein the dispensing signal indicates a dispensing event each time a container is manipulated to pour fluid filtered by a filter;
counting by the processing unit the number of dispensing events while ignoring any false dispensing events, wherein a false dispensing event occurs when a duration of a given dispensing signal is greater than a predetermined false dispensing period; and
outputting by the processing unit on a user interface a status of the filter as a function of the number of dispensing events.

15. The method according to claim 14, further comprising:
tracking by the processing unit an elapsed period of time from insertion of the filter in the container; and
outputting by the processing unit on the user interface the status of the filter as a further function of the elapsed period of time.

16. The method according to claim 15, further comprising:
receiving by a processing unit a reset signal from the user interface, wherein the rest signal indicates insertion of a new filter; and
resetting by the processing unit the count of the number of dispensing events and the elapsed period of time in response to the reset signal.

17. The method according to claim 15, further comprising outputting by the processing unit on the user interface a green light to indicate a first filter status when the number of dispensing events is less than a first predetermined number and the elapsed period of time is less than a first predetermined value, a yellow light to indicate a second filter status when the number of dispensing events is between the first predetermined number and a second predetermined number or the elapsed period of time is between the first predetermined value and a second predetermined value, and a red light to indicate a third filter status when the number of dispensing events is more than the second predetermined number or the elapsed period of time is more than the second predetermined value.

18. The method according to claim 14, wherein the status of the filter is output by the processing unit on the user interface for a predetermined period of time.

19. The method according to claim 14, wherein the status of the filter is output by the processing unit on the user interface in response to each dispensing event.

20. The method according to claim 14, further comprising:
receiving by a processing unit a reset signal from the user interface, wherein the rest signal indicates insertion of a new filter; and
resetting by the processing unit the count of the number of dispensing events in response to the reset signal.

21. The method according to claim 14, further comprising:
receiving by the processing unit a filter status request signal from the user interface; and
outputting the status of the filter by the processing unit on the user interface in response to the filter status request signal.

22. The method according to claim 14, further comprising outputting by the processing unit on the user interface a green light to indicate a first filter status when the number of dispensing events is less than a first predetermined number, a yellow light to indicate a second filter status when the number of dispensing events is between the first predetermined number and a second predetermined number, and a red light to indicate a third filter status when the number of dispensing events is more than the second predetermined number.

* * * * *